United States Patent Office 3,003,887
Patented Oct. 10, 1961

3,003,887
PROCESS FOR OBTAINING REFRACTORY ARTICLES HAVING A HIGH MULLITE CONTENT
Jean Pierre Kiehl, Lyon, France, assignor, by mesne assignments, to Societe Generale de Produits Refractaires, Paris, France, a corporation of France
No Drawing. Filed Oct. 28, 1958, Ser. No. 770,023
Claims priority, application France Oct. 31, 1957
7 Claims. (Cl. 106—67)

It is known that mullite, of formula $2SiO_2 \cdot 3Al_2O_3$, which is the richest in alumina (71.8% $Al_2O_3$) and the most refractory of all the alumina silicates, is also the only one stable at high temperatures. Accordingly, it is very desirable, in numerous refractory applications, to use silico-aluminous bricks containing the maximum amount possible of mullite.

Mullite is not found directly in nature but it can be obtained by transforming at a high temperature other alumina silicates, important layers of which exist. These silicates are either hydrated as kaolinite, which is the principal component of the refractory clays and whose formula $2SiO_2 \cdot Al_2O_3 \cdot 2H_2O$ corresponds to an alumina content (in the fired state) of 45.9%, or anhydrous as cyanite or disthen, andalousite, sillimanite, of different crystalline shapes, but of common formula $SiO_2 \cdot Al_2O_3$ corresponding to an alumina content of 62.9%. The reactions of transformation of these products are as follows:

$$3(2SiO_2 \cdot Al_2O_3) \rightarrow 3Al_2O_3 \cdot 2SiO_2 + 4SiO_4$$
kaolinite             mullite
$$3(SiO_2 \cdot Al_2O_3) \rightarrow 3Al_2O_3 \cdot 2SiO_2 + SiO_2$$
sillimanite           mullite But, even if these reactions of transformation were complete, the transformation of these native silicates to mullite could give only a proportion of mullite corresponding to their alumina content, since mullite contains 71.8% of alumina.

45.9/71.8=about 64% mullite for the kaolinite, which contains 45.9% alumina
62.9/71.8=about 87% mullite for the sillimanite, which contains 62.9% alumina It is these native silicates of the cyanite, andalousite or sillimanite type, the richest ones in alumina, which are the basic raw materials of the mullite bricks. But since these minerals, either in the raw state or in the calcined state, are devoid of plasticity, it is necessary, in order to make molded articles thereof, to add to them a binder, which is plastic itself and capable of transforming to mullite by firing at a high temperature. This plastic binder is a clay. A current composition of mullite bricks is as follows:

| | Percent |
|---|---|
| Clay (containing 95% kaolinite) | 20 |
| Sillimanite or cyanite | 80 |

If the transformation reactions were complete, such a brick could then contain in the maximum:

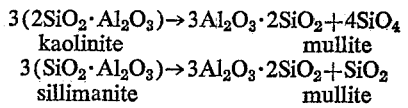

(64×0.2)+(87×0.8)=about 82% mullite

In practice, the observed contents of mullite range about 65 to 70%. This small content of mullite is due, on the one hand, to the fact that the preceding reactions of transformation, in the solid state, are slow, on the other hand, to the fact that the mineral impurities contained in the native silicates (lime, magnesia, oxides of iron and titanium, soda and potash) contribute to the formation of a vitreous phase, whose amount is the greater as the amount of impurities is higher, this vitreous phase leading to the lowering of the resistance to the deflection under load, to thermic shocks and to corrosion.

Since the mere transformation of the natural silicates, without any addition thereto, leads to theoretical amounts of mullite which are limited by the shortage of the alumina content of these silicates, it has been endeavored to increase this mullite content. A known process consists in reacting one on the other two silico-aluminous raw materials of different categories, the one containing less than 71.8% alumina, the other more than 71.8%, in proportions required so that the mixture has the alumina content of mullite, i.e., 71.8%. The first category comprises, for example, native minerals such as clays and kaolins, the second one, native or synthetic raw materials, such as bauxite, corundum, roasted, hydrated or molten alumina. Thus, when a mullite fire clay is to be obtained, an intimate mixture of these raw materials is made, which is afterwards fired for several hours at a temperature above 1650° C. or, more rarely, which is melted in an electric furnace.

When a composition of 71.8% alumina is used, 100% mullite should theoretically be obtained. As a matter of fact, when mullite is prepared by mere firing of solid bodies, the reactions are slow, so that, at the temperatures and during the times of firing which are industrially realizable, these reactions cannot be complete and the obtained mullite contents average 65 to 70% and do not exceed 75% under the most favorable conditions.

If the mullite fire clay is prepared by smelting, the mullite solidification being not congruent, the first crystal solidified at a temperature near 1930° C. is not mullite, but corundum which reacts afterwards on the residual liquid to give mullite, the solidification being ended at 1810° C. At such temperatures, the speed of cooling is rapid and this interval of about one hundred degrees is passed through too rapidly for the reaction of the corundum on the liquid to be complete. Then, in the solidified product, there is only 75% mullite, 10 to 15% corundum which has not reacted, and an amount of vitreous phase (10 to 15%) which increases as the raw materials used are less pure.

Besides, it is known that the amount of product formed in the course of a reaction in the solid state depends on the temperature and the time of the reaction, the same yield being possibly obtained either by prolonging the reaction time or by raising its temperature. But, for the same temperature and the same time of reaction, the yield is the greater as the bodies to be reacted are more active and as their surface of contact is greater, this surface depending itself on the specific surface of each of the bodies and on the shape of the elementary particles of these bodies. With respect to the use of any raw materials, the utilization of active raw materials and of a great specific surface results in the following advantages:

To obtain, at the same temperature, but in a shorter time, at least the same amount of reaction product,
To obtain during the same time, but at a lower temperature, at least the same amount of reaction product, and
To obtain during the same time and at the same temperature, substantially higher amounts of reaction product.

It is known also that the raw materials should be as pure as possible, so that the minimum amount of vitreous phase is formed.

The present invention relates to a process for obtaining refractory products having a high content of mullite, which comprises reacting in the solid pulverulent state, at temperatures between about 1350° C. and 1450° C., substantially equivalent amounts of the two raw materials, the one with less than 71.8% alumina, the other with more than 71.8% alumina, having the following chemical and physical characteristics, which enable them to fulfill best the conditions recited hereabove:

(1) One of the two raw materials is a kaolin clay giving by heating between 550° C. and 700° C. metakaolin which decomposes above this temperature and below 1450° C. to give gamma alumina. This clay, whose elemental particles are thin flakes enabling it to have the maximum contact surface with other bodies having the same form, must have a high specific surface which, measured by the so-called BET method (Brunauer, Emmett, Teller), must be greater than about 25 m.$^2$/g., and preferably is between 40 and 60 m.$^2$/g. On the other hand, this clay must be composed of fairly pure kaolinite, whose content in oxides other than silica and alumina must not be substantially above 3%. Its alumina content is about 37% and its ignition loss about 14%.

(2) The other raw material must be, either a pure or commercial gamma alumina, or preferably a monohydrated alumina capable of giving, by thermal dehydration, an extremely reactive gamma alumina. According to the invention, one uses preferably a purified natural boehmite or an artificial boehmite obtained from alumina trihydrate by hydrothermal reaction, both of which give by thermal decomposition, gamma alumina having the greatest and most reactive specific surface. This boehmite must have a specific surface, measured by the BET method, of at least 3 m.$^2$/g., and preferably between 20 and 30 m.$^2$/g. It is found in nature or can be prepared in the form of flakes having a thickness smaller than a tenth of a micromillimeter, thus enabling said boehmite to have a very great contact surface with kaolinite. This boehmite, which can be obtained in a state of great purity, preferably should not have a total amount of impurities above about 2%. In particular, the soda preferably should be less than 0.10%. Its alumina content is about 82% and its ignition loss about 17%.

According to the invention, a clay and a boehmite are mixed, having the above-defined properties in the following proportions:

44 to 55% of kaolin clay_____ Preferably 50%
44 to 55% of boehmite_____ Preferably 50%

Such a mixture has an alumina content (in the fired state) varying from 67% Al$_2$O$_3$ to 75% Al$_2$O$_3$, and includes the range of alumina in mullite which, although it has a theoretical alumina content of 71.8%, exists in the state of a single phase containing alumina between 68% and 74%.

The two raw materials are previously very finely crushed to the dimension of about 100 microns and either mixed together or added to other refractory bodies such as corundum, sillimanite, silicon carbide, graphite, etc.

The mixture is heated for a maximum of two hours at a temperature between 1350° C. and 1450° C.

The heating at this temperature is sufficient to obtain a proportion of about 80 to 85% mullite. This proportion is fixed as soon as this temperature is reached.

In some applications, however, where, in addition to the great amount of mullite, supplementary characteristics are desired, for example, if it is desired to obtain a particularly dense refractory material or insulating brick utilizable up to 1650° C. without substantial deformation, the firing can, of course, be carried above 1450° C.

The following non-restrictive examples further illustrate the process and the results of the invention.

*Example 1.—Preparation of mullite fire clay*

The preceding mixture, with 50% clay of a specific surface of 60 m.$^2$/g., and containing in the fired state 42% alumina and 3% oxides other than silica and alumina, and 50% artificial boehmite, obtained by hydrothermal transformation of the alumina trihydrate, of a specific surface of 6 m.$^2$/g., containing in the fired state 99.5% alumina and 0.5% impurities, and free from soda, was pugged for 10 minutes in a dry pugmill, then pugged again with an addition of 10% water and extruded into bricks of 220 x 110 x 60 mm., which were fired in a tunnel furnace at a temperature of 1450° C. for 4 hours. The following characteristics were obtained:

| Firing Temperature | Absolute Density | Apparent Density | Open Porosity, Percent | Closed Porosity, Percent | Mullite Content, Percent |
|---|---|---|---|---|---|
| 1,450° C | 3.15 | 2.78 | 5 | 12 | 80–85 |

This mullite fire clay was afterwards crushed to the desired dimensions.

*Example 2.—Making of compressed bricks of mullite*

A mixture was made as follows:

| | Percent |
|---|---|
| Fire clay containing 80–85% mullite, 4 mm.–2 mm. | 25 |
| Fire clay containing 80–85% mullite, 2 mm.–0.7 mm. | 15 |
| Fire clay containing 80–85% mullite, 0.7 mm.–0.2 mm. | 15 |
| Fire clay containing 80–85% mullite, 0.2 mm. | 25 |
| Clay boehmite mixture in equal parts | 20 |
| Water | 5 |

This mixture was pugged in a pugmill suitable for dry paste mixtures, compressed into bricks and the bricks were fired at a temperature of 1450° C., then at 1550° C., according to the desired results.

The following characteristics were obtained:

| Firing Temp. | Apparent Density | Open Porosity, percent | Mechanical Resistance, kg./cm.$^2$ | Temperature of sinking for a load of 2 kg./cm.$^2$ | | Mullite Content, percent |
|---|---|---|---|---|---|---|
| | | | | Beginning, ° C. | 5 percent, ° C. | |
| 1,450° C | 2.20 | 24 | 400 | 1,540 | 1,600 | 80–85 |
| 1,550° C | 2.40 | 16 | 800 | 1,550 | 1,610 | 80–85 |

*Example 3.—Manufacture of mullite bricks of soft paste*

A mixture was made as follows:

| | Percent |
|---|---|
| Fire clay containing 80–85% mullite, 4 mm.–2 mm. | 20 |
| Fire clay containing 80–85% mullite, 2 mm.–0.7 mm. | 10 |
| Fire clay containing 80–85% mullite, 0.7 mm.–0.2 mm. | 10 |
| Clay boehmite mixture in equal parts | 60 |
| Water | 8 |

This mixture was pugged and extruded in an apparatus suitable for this kind of product and fired at a temperature of 1450° C., then at 1550° C., according to the desired result.

The following characteristics were obtained:

| Firing Temp. | Apparent Density | Open Porosity, percent | Mechanical Resistance, kg./cm.$^2$ | Temperature of sinking for a load of 2 kg./cm.$^2$ | | Mullite Content, percent |
|---|---|---|---|---|---|---|
| | | | | Beginning, ° C. | 5 percent, ° C. | |
| 1,450° C | 2.25 | 25 | 300 | 1,480 | 1,560 | 80–85 |
| 1,550° C | 2.36 | 20 | 600 | 1,530 | 1,600 | 80–85 |

*Example 4.—Making of refractory insulating bricks of mullite*

A mixture was made as follows:

| | Percent |
|---|---|
| Clay boehmite mixture in equal parts | 72 |
| Waste of refractory insulating bricks of mullite | 10 |
| Dust | 18 |
| Water | 15 |

The mixture was first pugged for two minutes in a pugmill of the Eirich type, then passed through a mixing-extruding set where it was rehumidified, extruded and cut in the form of rough shapes.

The rough shapes, dried in a tunnel drying room, were afterwards fired in a tunnel furnace at 1650° C.

The following characteristics were obtained:

| | |
|---|---|
| Apparent density | About 0.9–1.0. |
| Modulus of rupture | About 30 kg./cm.² |
| Mechanical resistance | About 30–40 kg./cm.² |
| Mullite content | 80–85%. |
| Post shrinkage 2 hours at 1650°% | Below 1%. |

According to the invention, the kaolin clay employed contains from about 15 to about 50% alumina, the clay preferably containing at least 30% alumina. The boehmite or other form of gamma alumina contains about 80 to 100% alumina.

The invention is not limited to the preferred embodiment but may be otherwise embodied or practiced within the scope of the following claims.

I claim:

1. A process for obtaining refractory products having a high mullite content, which comprises reacting in the solid pulverulent state, at a temperature of about 1350° C. to 1450° C., from 45% to 55% by weight of kaolin clay containing from about 15 to 50% alumina and from 45% to 55% of boehmite containing, in the fired state, about 90% to 100% alumina, said kaolin clay having a specific surface as measured by the BET method (Brunauer, Emmett, Teller) greater than 25 m.²/g., said boehmite having a specific surface of at least 3 m.²/g.

2. A process according to claim 1, wherein said kaolin clay gives metakaolin by heating between 550° C. and 700° C., which decomposes at a temperature below 1450° C. to give gamma alumina.

3. A process according to claim 1, wherein said boehmite is a purified natural boehmite.

4. A process according to claim 1, wherein said boehmite is an artificial boehmite obtained from alumina trihydrate by hydrothermal reaction.

5. A process according to claim 2, wherein the content of said kaolin clay in oxides other than silica and alumina is not substantially above 3%, wherein the content of impurities in said boehmite is not above about 2% and wherein the soda content of said boehmite is less than 0.10%.

6. A process for obtaining refractory products having a high mullite content, which comprises reacting in the solid pulverulent state, at a temperature of about 1350° C. to 1450° C., from 45% to 55% by weight of kaolin clay containing from about 15 to 50% alumina and from 45% to 55% of gamma alumina, said kaolin clay having a specific surface as measured by the BET method (Brunauer, Emmett, Teller) greater than 25 m.²/g.

7. A process according to claim 1, wherein said kaolin clay has a specific surface between 40 and 60 m.²/g. and said boehmite has a specific surface between 20 and 30 m.²/g.

References Cited in the file of this patent

UNITED STATES PATENTS

| | | |
|---|---|---|
| 1,682,249 | Riddle | Aug. 28, 1928 |
| 1,712,005 | Lambie et al. | May 7, 1929 |
| 1,802,296 | Willetts | Apr. 21, 1931 |
| 2,672,671 | Robinson | Mar. 23, 1954 |
| 2,678,282 | Jones | May 11, 1954 |
| 2,688,558 | Rankine | Sept. 7, 1954 |
| 2,810,182 | Brandes | Oct. 22, 1957 |

UNITED STATES PATENT OFFICE
CERTIFICATION OF CORRECTION

Patent No. 3,003,887            October 10, 1961

Jean Pierre Kiehl

It is hereby certified that error appears in the above numbered patent requiring correction and that the said Letters Patent should read as corrected below.

Column 1, line 31, for "+4SiO$_4$" read -- +4SiO$_2$ --; column 3, lines 45 and 46, for "44 to 55%", each occurrence, read -- 45 to 55% --; column 5, line 21, for "1650°%" read -- 1650° C. --.

Signed and sealed this 3rd day of April 1962.

(SEAL)
Attest:

ERNEST W. SWIDER
Attesting Officer

DAVID L. LADD
Commissioner of Patents